(12) United States Patent
Kubozono et al.

(10) Patent No.: US 8,482,817 B2
(45) Date of Patent: Jul. 9, 2013

(54) IMAGE READING APPARATUS AND METHOD FOR CONTROLLING THE SAME

(75) Inventors: Kenji Kubozono, Kawasaki (JP); Yasuyuki Shinada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 12/766,462

(22) Filed: Apr. 23, 2010

(65) Prior Publication Data

US 2010/0315690 A1    Dec. 16, 2010

(30) Foreign Application Priority Data

Jun. 15, 2009    (JP) ................ 2009-142538

(51) Int. Cl.
| | |
|---|---|
| H04N 1/04 | (2006.01) |
| H04N 1/21 | (2006.01) |
| H04N 1/46 | (2006.01) |
| H04N 1/36 | (2006.01) |
| H04N 1/393 | (2006.01) |
| G06F 3/12 | (2006.01) |
| H04B 10/00 | (2006.01) |
| G03G 9/08 | (2006.01) |
| B41J 2/435 | (2006.01) |
| G01J 1/32 | (2006.01) |
| H01J 3/14 | (2006.01) |
| G05F 3/04 | (2006.01) |

(52) U.S. Cl.
USPC ........... 358/475; 358/474; 358/296; 358/451; 358/486; 358/1.13; 358/1.15; 358/3.06; 358/504; 358/509; 358/497; 358/412; 398/135; 347/247; 347/156; 250/205; 250/235; 250/234; 323/312; 399/51; 438/584; 345/76

(58) Field of Classification Search
USPC .............. 358/475, 474, 296, 1.13, 1.15, 3.06, 358/504; 398/135; 347/247; 250/205; 323/312; 399/51; 438/584; 345/76
See application file for complete search history.

(56) References Cited

U.S. PATENT DOCUMENTS

| | | | | |
|---|---|---|---|---|
| 5,161,029 A | * | 11/1992 | Yamanishi | .................... 358/296 |
| 6,037,584 A | * | 3/2000 | Johnson et al. | ................ 250/235 |
| 7,245,389 B2 | * | 7/2007 | Dougherty et al. | .......... 358/1.13 |
| 2002/0140996 A1 | * | 10/2002 | Spears et al. | .................. 358/504 |
| 2004/0145763 A1 | * | 7/2004 | Dougherty et al. | .......... 358/1.13 |
| 2006/0077135 A1 | * | 4/2006 | Cok et al. | ......................... 345/76 |
| 2007/0216953 A1 | * | 9/2007 | Kikuchi et al. | .............. 358/3.06 |
| 2007/0253036 A1 | * | 11/2007 | Matsunaga | ................... 358/497 |

(Continued)

FOREIGN PATENT DOCUMENTS

JP    2003-207860 A    7/2003

*Primary Examiner* — Charlotte M Baker
*Assistant Examiner* — Rury Grisham
(74) *Attorney, Agent, or Firm* — Canon U.S.A., Inc., IP Division

(57) ABSTRACT

An image reading apparatus capable of reading documents includes a reading unit including a light emitting element, a mechanism configured to move the reading unit, and a control unit configured to control the reading unit and the mechanism both to carry out reading by turning on the light emitting element and moving the reading unit and to temporarily stop moving the reading unit upon occurrence of a predetermined factor. The control unit sets a first current value which is caused to flow through the light emitting element when reading is carried out and sets a second current value which is less than the first current value and which is caused to flow through the light emitting element when the reading unit is temporarily stopped.

9 Claims, 11 Drawing Sheets

U.S. PATENT DOCUMENTS

| | | | |
|---|---|---|---|
| 2007/0281453 A1* | 12/2007 | Nagatsuka et al. | 438/584 |
| 2008/0292344 A1* | 11/2008 | Nagumo | 399/51 |
| 2009/0039860 A1* | 2/2009 | Suzuki et al. | 323/312 |
| 2009/0116080 A1* | 5/2009 | Maruyama | 358/475 |
| 2009/0224136 A1* | 9/2009 | Ikegami | 250/205 |
| 2010/0053678 A1* | 3/2010 | Yoshihisa et al. | 358/1.15 |
| 2010/0220368 A1* | 9/2010 | Kubo | 358/474 |
| 2010/0225731 A1* | 9/2010 | Inoue et al. | 347/247 |
| 2011/0058819 A1* | 3/2011 | Azegami et al. | 398/135 |

* cited by examiner

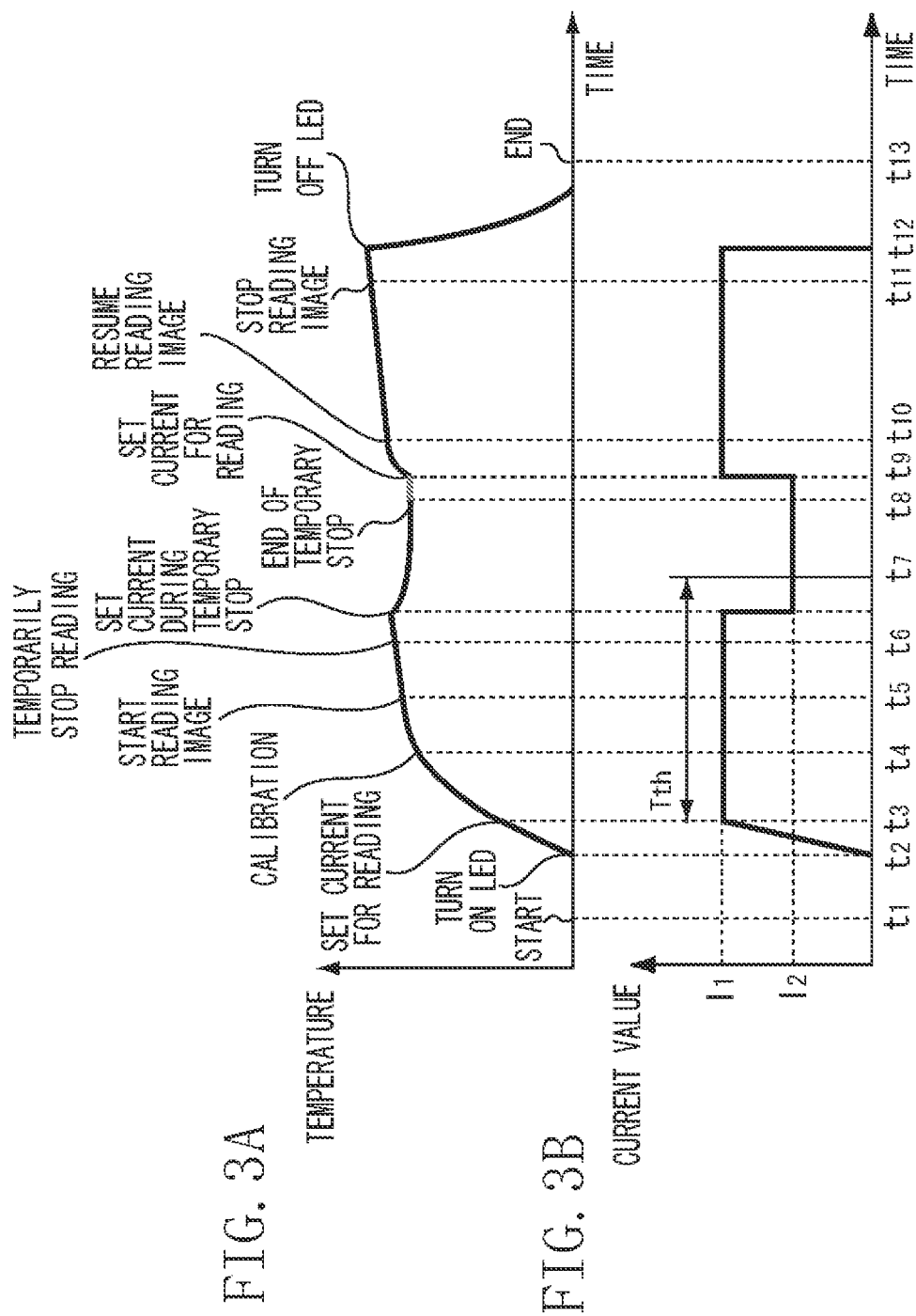

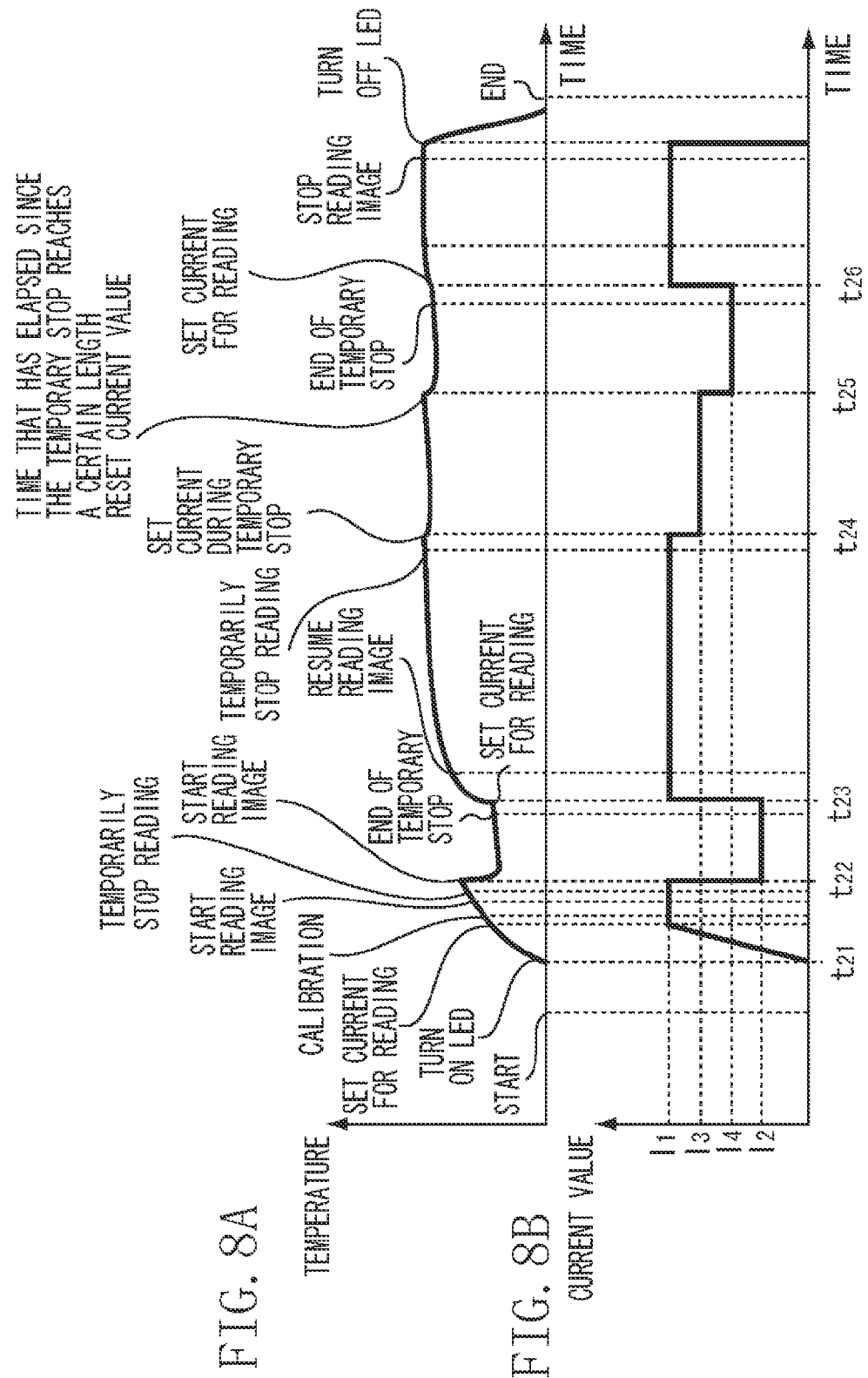

IMAGE READING APPARATUS AND METHOD FOR CONTROLLING THE SAME

BACKGROUND OF THE INVENTION

1. Field of the Invention

The present invention relates to an image reading apparatus, and in particular, to an image reading apparatus configured to control optical elements.

2. Description of the Related Art

Normally, when the temperature of a light-emitting diode (LED) generally used in a reading unit of an image reading apparatus is increased, the luminance of the LED is decreased. When the luminance is decreased, the density of the read image is increased. "Japanese Patent Application Laid-Open No. 2003-207860" discusses maintaining the temperature of such LED at a constant level by arranging a temperature sensor and a heating element near the LED and controlling the heating element based on information from the temperature sensor.

During a read operation, at times, the image reading apparatus temporarily stops the read operation. For example, when the image reading apparatus is reading a document, if a buffer memory therein becomes full and cannot store any more read data, the image reading apparatus temporarily stops reading the document.

If not controlled, the temperature of an LED is increased while the read operation is temporarily stopped, and as a result, the luminance of the LED is decreased. Thus, a density difference is caused between images read before and after the temporary stop (after the read operation is resumed), and the border between the two images is observed as a noticeable image seam. If the technique as discussed in Japanese Patent Application Laid-Open No. 2003-207860 is used to avoid a decrease of such image quality, a temperature sensor, a heating element, and a circuit which controls these elements are required. Thus, a further reduction of cost is hindered.

SUMMARY OF THE INVENTION

The present invention is directed to an image reading apparatus and a method for controlling the same. According to an aspect of the present invention, the image reading apparatus includes a reading unit including a light emitting element, a mechanism configured to move the reading unit, and a control unit configured to control the reading unit and the mechanism both to carry out reading by turning on the light emitting element and moving the reading unit and to temporarily stop moving the reading unit upon occurrence of a predetermined factor. The control unit sets a first current value which is caused to flow through the light emitting element when the reading is carried out and sets a second current value which is less than the first current value and which is caused to flow through the light emitting element when the reading unit is temporarily stopped.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are timing diagrams illustrating a read operation according to a first exemplary embodiment.

FIGS. 8A and 8B are timing diagrams illustrating a read operation according to the third exemplary embodiment.

DESCRIPTION OF THE EMBODIMENTS

Various exemplary embodiments, features, and aspects of the invention will be described in detail below with reference to the drawings.

Figure 2:
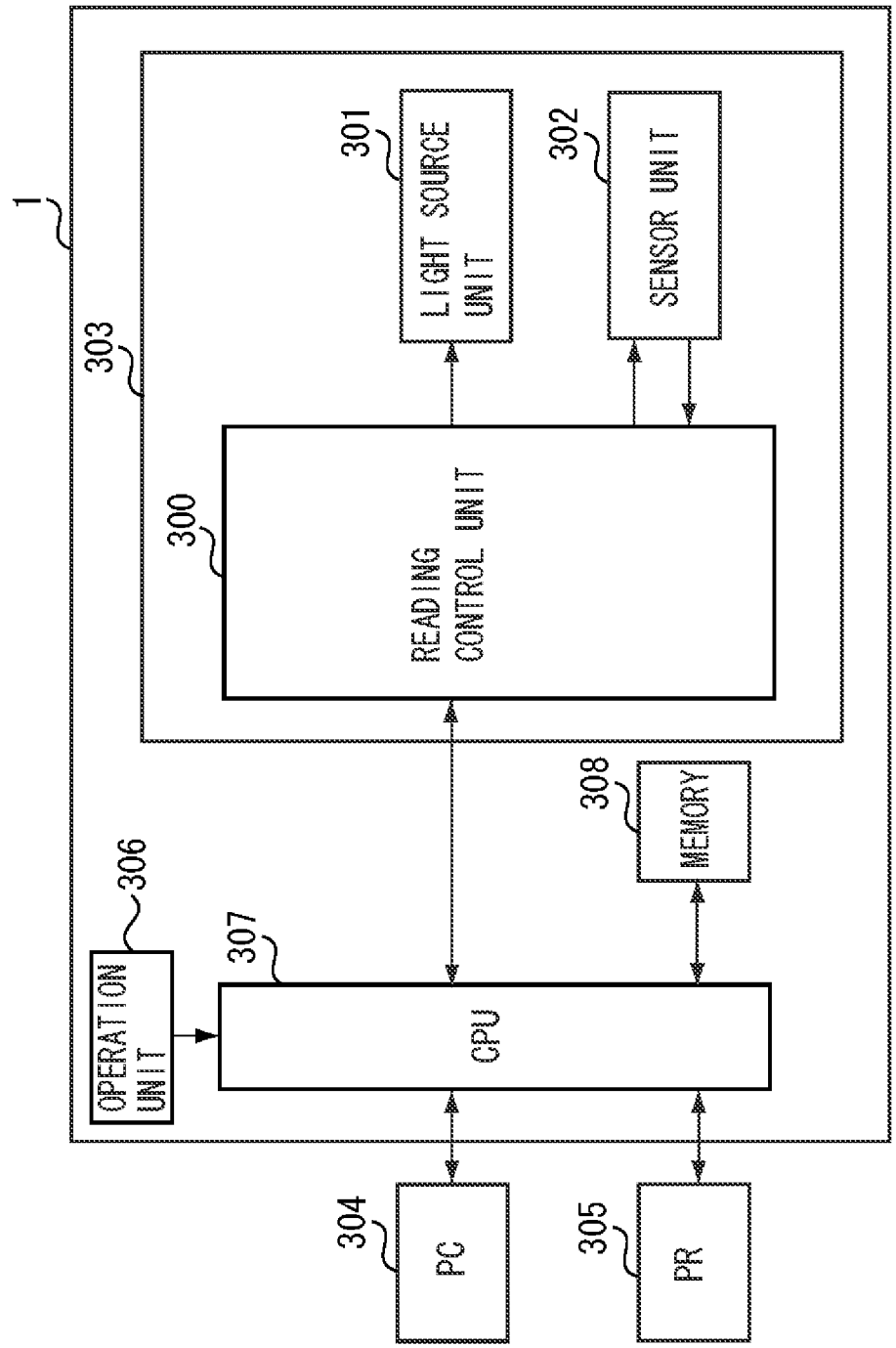
FIG. 2 is a control block of an image reading apparatus according to an exemplary embodiment.

FIG. 2 is a control block of an image reading apparatus 1. A reading control unit 300 controls a light source unit 301 and a sensor unit 302 included in a reading unit 303. The reading control unit 300 receives instructions from a central processing unit (CPU) 307 to control the units 301 and 302. The CPU 307 controls operations of the image reading apparatus 1. For example, the CPU 307 moves the reading unit 303 and stores image data read by the reading unit 303 in a memory 308. The CPU 307 processes commands from an operation unit 306 and controls transfer of image data to a host apparatus (a personal computer (PC) 304) or a printer (PR) 305. When the image reading apparatus is reading an image of a document, if a buffer memory included in the memory 308 becomes full of image data to be transferred, the CPU 307 temporarily stops the read operation by stopping the transfer of the reading unit 303 and the operation of the sensor unit 302. When the CPU 307 determines that the buffer memory is ready to store an enough amount of data, the CPU 307 resumes the read operation.

Figure 1:
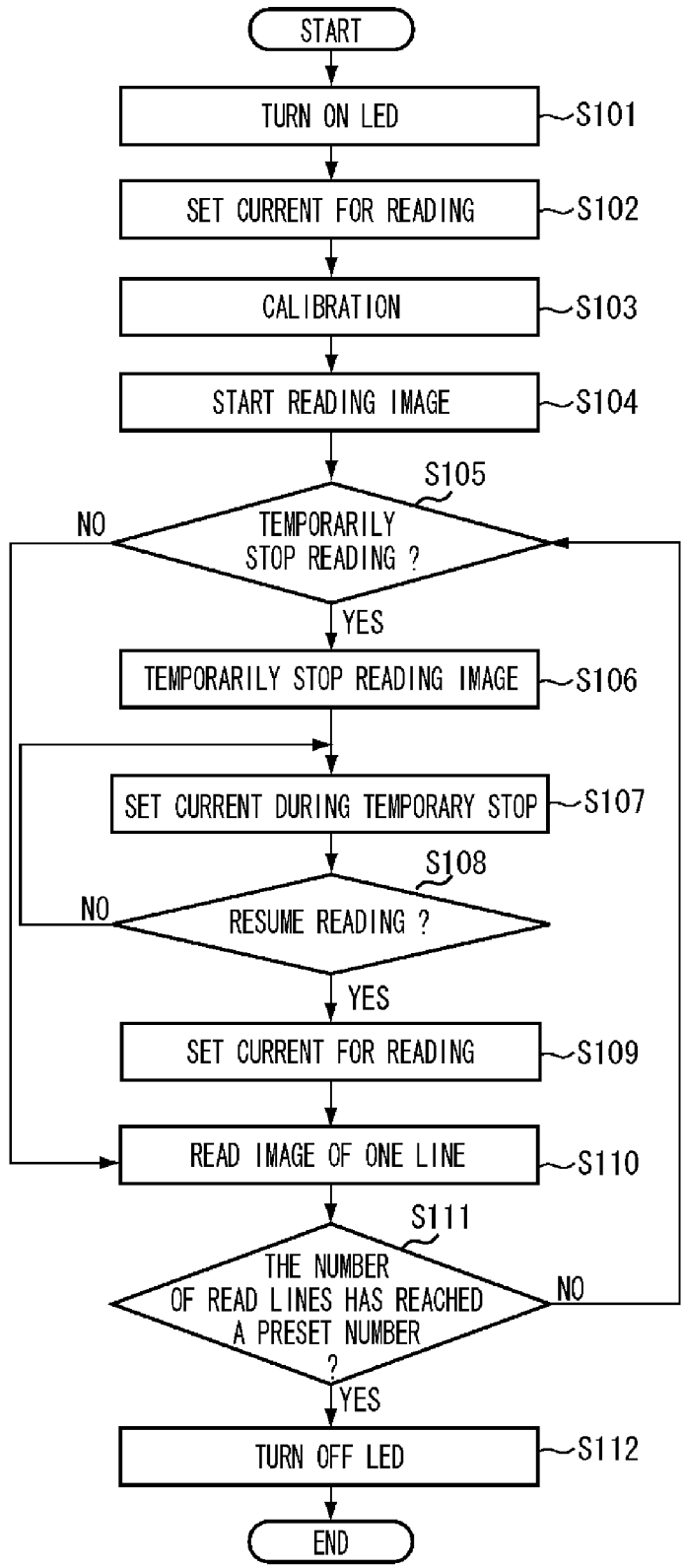
FIG. 1 is a flow chart illustrating a read operation of an image reading apparatus according to an exemplary embodiment.

FIG. 1 is a flow chart of an operation controlled by the CPU 307 and the reading control unit 300. The CPU 307 receives instructions to start a read operation from the operation unit 306 or the host apparatus 304. In step S101, the reading control unit 300 turns on the light source unit 301. As illustrated in FIG. 3A, the temperature of the light source unit 301 is gradually increased. The reading control unit 300 includes a setting unit, and in step S102, the setting unit sets a read current. In step S103, the reading unit 303 carries out calibration to suppress impact caused by a variation of the light source unit 301 and the sensor unit 302.

In step S104, the light source unit 301 and the sensor unit 302 start reading an image. The sensor unit 302 reads an image line by line, and the CPU 307 temporarily stores the read data in the memory 308. Next, the CPU 307 transfers the data to the host apparatus 304 or the recording apparatus 305. In step S105, whether to temporarily stop (suspend) the read operation is determined. If the read operation is stopped (YES in step S105), the operation proceeds to step S106. If not (NO in step S105), the operation proceeds to step S111. In step S106, the reading control unit 300 temporarily stops the operation of the sensor unit 302. In step S107, the reading control unit 300 sets a current value flowing through the light source unit 301 to be I2. Namely, if a certain factor arises when the reading unit is carrying out a read operation, the reading unit is stopped.

In step S108, whether to resume the reading is determined. If the read operation is resumed (YES in step S108), the operation proceeds to step S109. If not (NO in step S108), the operation returns to step S107. In step S109, the reading control unit 300 amplifies (increases) the current flowing through the light source unit 301. In step S110, the reading control unit 300 allows the sensor unit 302 to read an image of one line (resumption of reading). In step S111, the number of read lines is determined. If the number of read lines has reached a preset value (YES in step S111), the operation proceeds to step S112. If not (NO in step S111), the operation returns to step S105. In step S112, the reading control unit 300 stops the operation of the light source unit 301 and the sensor unit 302.

FIG. 3A illustrates temperature changes of an LED, and FIG. 3B illustrates a current value flowing through an LED set in the light source unit 301. Timings t1 to t13 are aligned between FIG. 3A and FIG. 3B.

At timing t1, the reading unit 303 starts moving. From timings t2 to t3, the reading control unit 300 increases the current value. At timing t3, the reading control unit 300 sets a current value I1. At timing t5, the reading control unit 300 starts reading an image (start reading the first one line). At timing t6, the reading control unit 300 stops moving the reading unit 303, and at timing t7, the reading control unit 300 sets a current value I2. The reading control unit 300 may stop moving the reading unit 303 and set the current value I2 at the same timing.

At timing t8, the reading control unit 300 resumes moving the reading unit 303, and at timing t9, the reading control unit 300 sets the current value I1. At timing t10, the reading control unit 300 resumes reading an image. Next, at timing t11, the reading unit 303 reads an image of the last line, and at timing t12, the reading control unit 300 sets the current value to be 0. From timing t8 to t10, if necessary, the reading control unit 300 carries out position adjustment control to read an image from where the reading unit 303 is temporarily stopped.

Figure 4A:
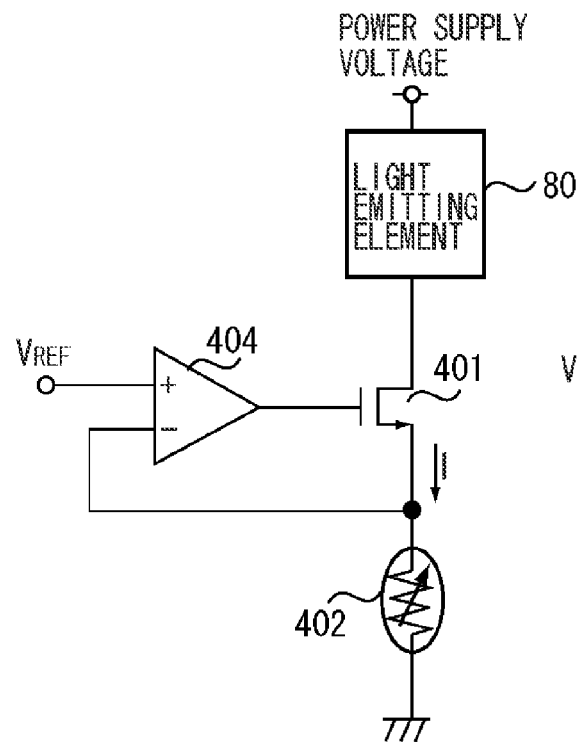
FIGS. 4A and 4B illustrate configurations of light source units according to exemplary embodiments.

FIG. 4A illustrates a configuration of the light source unit 301. When a transistor 401 is turned on and a current I flows therethrough, a light emitting element such as a light emitting diode (LED) 802 is turned on. A comparator 404 compares a voltage across a variable resistor 402 with a reference voltage Vref and outputs a signal that turns on/off the transistor 401. The reading control unit 300 sets the variable resistor 402 and controls on/off of the comparator 404.

For example, the reading control unit 300 sets the resistor 402 to have resistance values R1 and R2 corresponding to the current values I1 and I2, respectively. The reading control unit 300 maintains the comparator 404 in an on-state when a read operation is carried out and in an off-state when a read operation is not carried out.

Figure 4B:
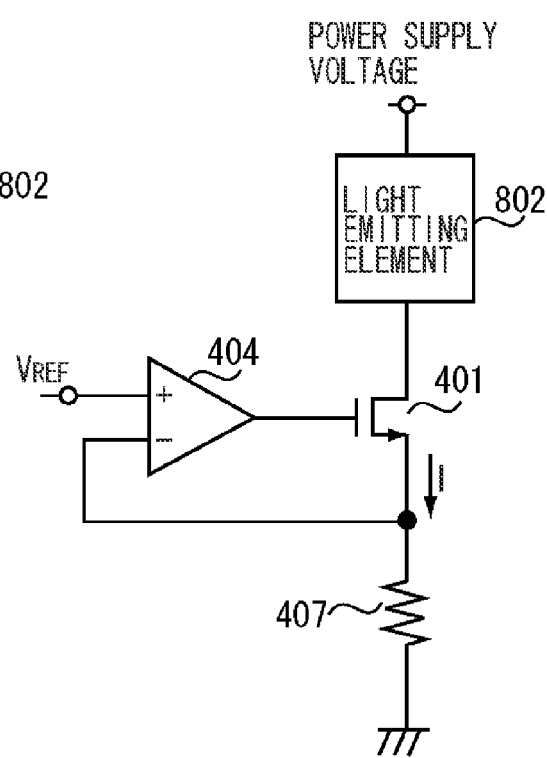

FIG. 4B illustrates another configuration of the light source unit 301. A difference between FIGS. 4A and 4B is that the resistor 407 has a fixed value. The reading control unit 300 controls on/off time of the comparator 404 based on pulse width modulation (PWM). For example, to set the above current values I1 and I2, the reading control unit 300 sets on-duties corresponding to the current values I1 and I2 to be A% and B%, respectively.

Figures 5A, 5B:
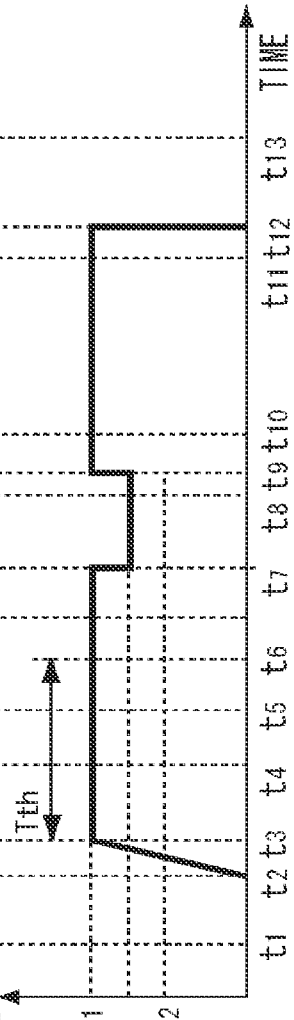
FIGS. 5A and 5B are timing diagrams illustrating a read operation according to a second exemplary embodiment.

FIGS. 5A and 5B are timing diagrams illustrating a read operation according to a second exemplary embodiment. FIG. 5A illustrates the temperature of an LED and FIG. 5B illustrates a current value flowing through an LED set in the light source unit 301. Descriptions about the features common between FIGS. 5A-B and 3A-B will be omitted, and differences between FIGS. 5A-B and 3A-B will be described.

Figure 7A:
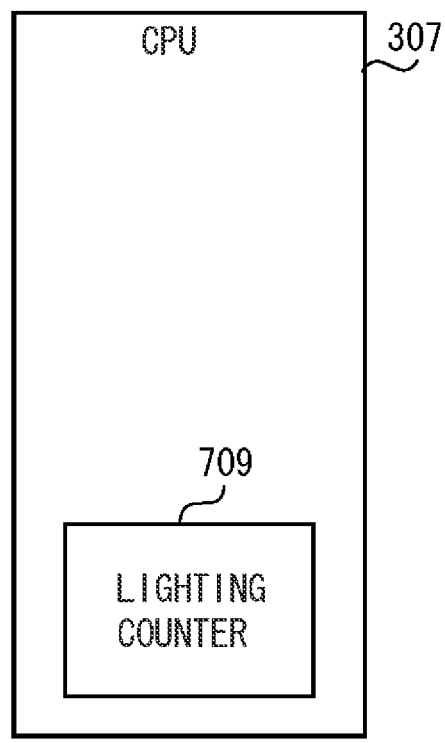
FIGS. 7A and 7B illustrate configurations according to a third exemplary embodiment.

Upon receiving a notification about a temporary stop (suspension) from the reading control unit 300, the CPU 307 compares an elapsed time with a threshold. Next, based on the comparison result, the CPU 307 notifies the reading control unit 300 of information about a current value to be set. Based on the information about the current value to be set, the reading control unit 300 sets the current value flowing through the LED. As illustrated in FIG. 7A, the CPU 307 uses a lighting counter 709 arranged therein to measure the elapsed time.

Figure 6:
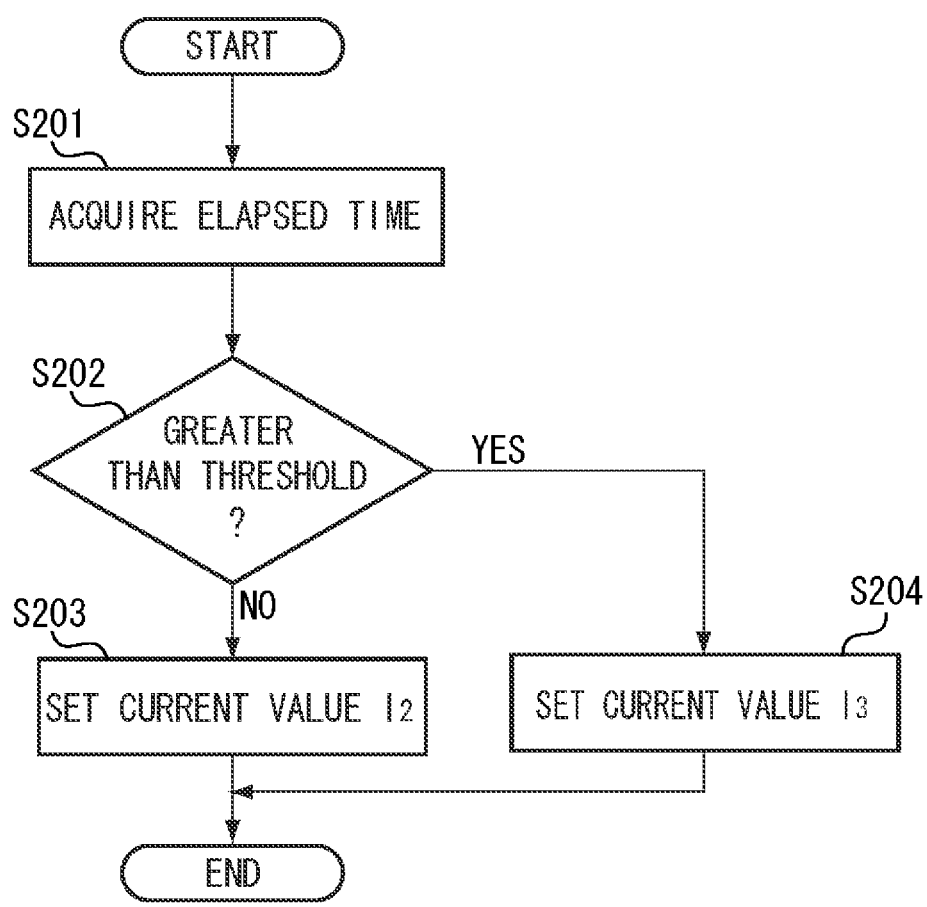
FIG. 6 is a flow chart illustrating a current setting process in a read operation according to the second exemplary embodiment.

In FIGS. 5A and 5B, the CPU 307 compares the elapsed time from timing t2 when the LED is turned on to timing t6 when the reading unit 303 is temporarily stopped, with a time threshold Tth. At timing t7, the CPU 307 controls a current value to be set. This control is carried out in the above step S107 of FIG. 1. FIG. 6 is a flow chart illustrating a current value determination and setting process. In step S201, the CPU 307 acquires the elapsed time. In step S202, the CPU 307 determines a current value to be set, based on the acquired time and the threshold Tth. If the acquired time is less than the threshold Tth (NO in step S202), the CPU 307 sets the current value I2. If the elapsed time is greater than the threshold Tth (YES in step S202), the CPU 307 sets the current value I3 (I2<I3). Namely, based on the length of time during which the LED is turned on (time that has elapsed since the LED is turned on), the current value flowing through the LED while the reading unit is stopped is determined.

Since the elapsed time from timing t2 when the LED is turned on to timing t6 when the reading unit 303 is temporarily stopped is less than the threshold Tth in FIG. 3B describing the first exemplary embodiment, the CPU 307 sets the current value that flows through the LED during the temporary stop to be I2.

FIGS. 8A and 8B are timing diagrams illustrating a read operation according to a third exemplary embodiment. Differences between the third exemplary embodiment and the first and second exemplary embodiments will be hereinafter described, and descriptions of the same features among the above embodiments will be omitted.

FIG. 8A illustrates the temperature of an LED, and FIG. 8B illustrates a current value of an LED set in the light source unit 301. Description of the same features among FIGS. 8A-B, 3 A-B, and 5 A-B will be omitted, and differences among FIGS. 8 A-B, 3 A-B, and 5 A-B will be described.

Figure 7B:
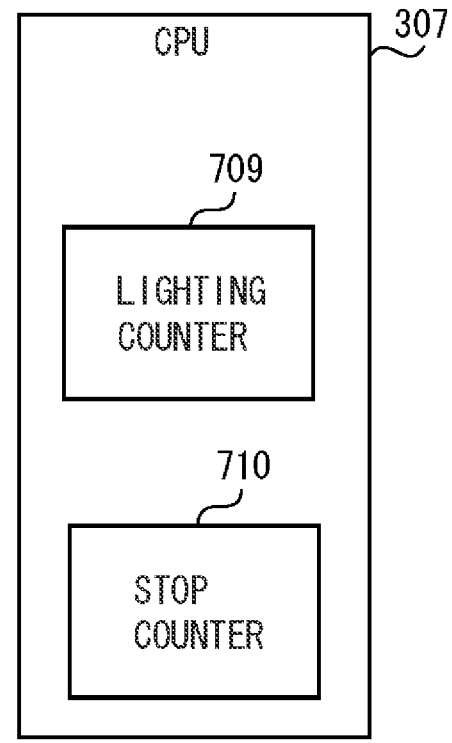

Upon receiving a notification about a temporary stop from the reading control unit 300, the CPU 307 compares the time that has elapsed since the reading unit 303 is temporarily stopped with a threshold. Next, based on the comparison result, the CPU 307 notifies the reading control unit 300 of information about a current value to be set. Based on the information, the reading control unit 300 sets the value of a current flowing through the LED. As illustrated in FIG. 7B, the CPU 307 uses a stop counter 710 arranged therein to measure the elapsed time.

As illustrated in FIG. 8A, at timing t24, the current value I3 is set, and until timing t25, this current value is maintained. Next, at timing t25, the current value I4 is set and until timing t26, this current is maintained. The current value I4 is less than the current value I3. Namely, based on the time that has elapsed since the reading unit 303 is stopped, the current value to be set is determined.

Figure 9:
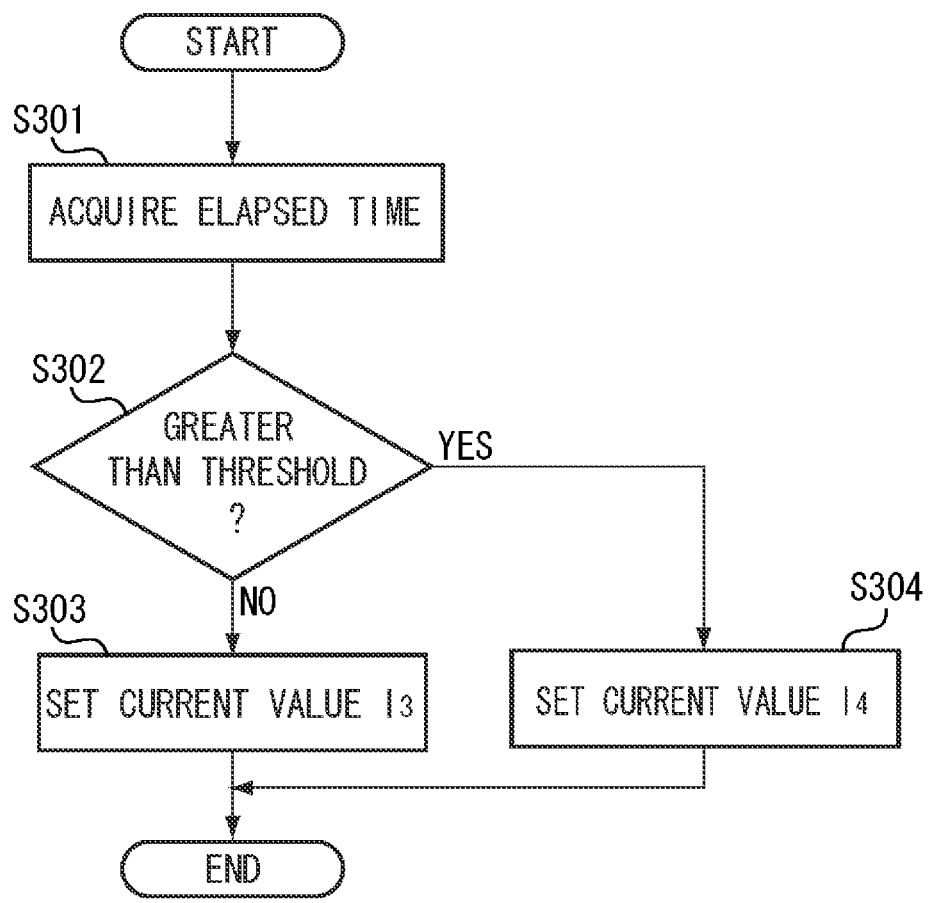
FIG. 9 is a flow chart illustrating a current setting process in a read operation according to an exemplary embodiment.

This control is carried out in the above step S107 of FIG. 1. FIG. 9 is a flow chart illustrating a current value determination and setting process. In step S301, the CPU 307 acquires the elapsed time. In step S302, based on the acquired time and the threshold Tth, the CPU 307 determines a current value to be set. If the acquired time is less than the threshold Tth (NO in step S302), the CPU 307 sets the current value I3. If the elapsed time is greater than the threshold Tth (YES in step S302), the CPU 307 sets the current value I4 (I4<I3).

Figure 10A:
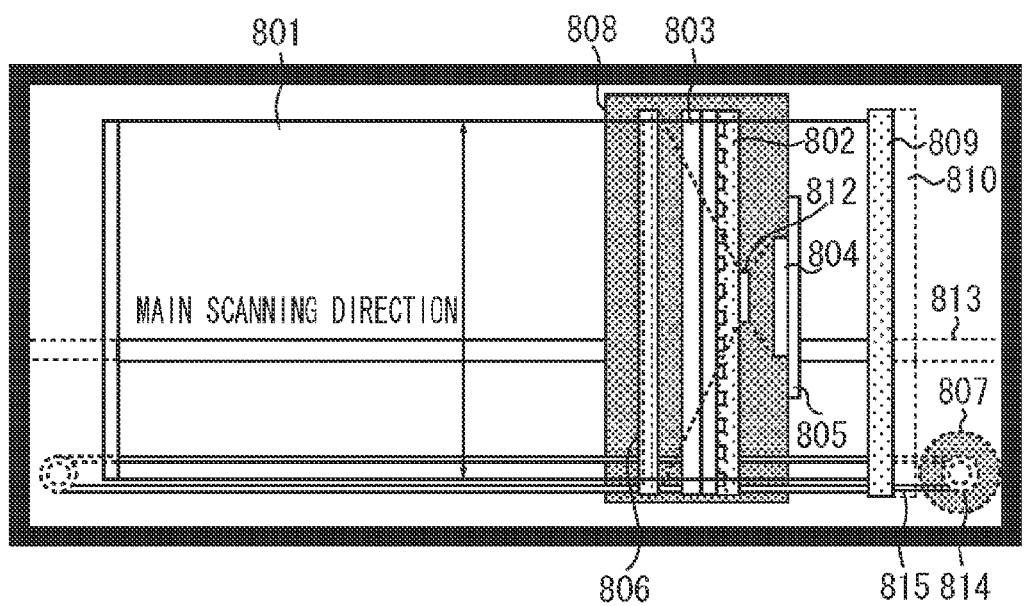
FIGS. 10A and 10B are plan and sectional views of an image reading apparatus according to an exemplary embodiment.
Figure 10B:
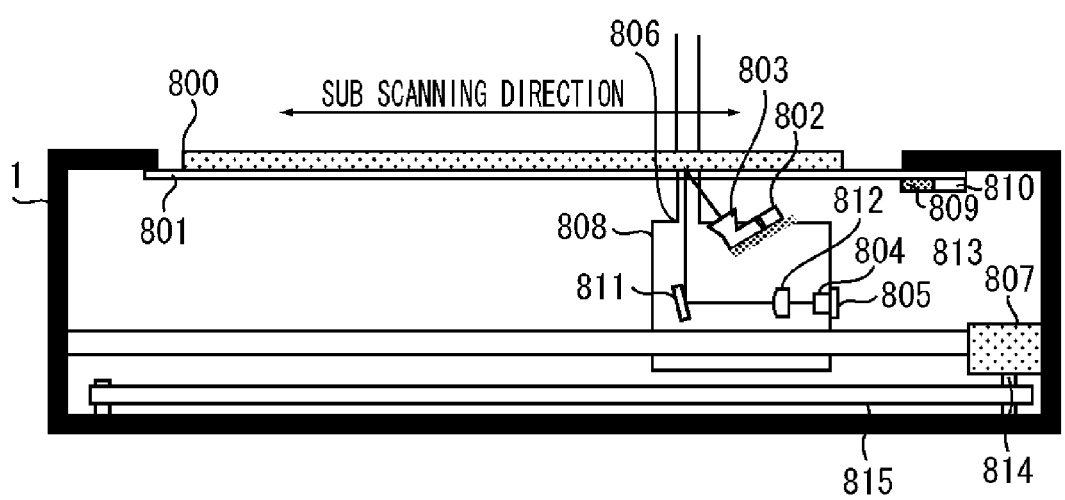

The image reading apparatus applicable to the first to third exemplary embodiments will be hereinafter described. FIGS. 10A and 10B are plan and sectional views of an image reading apparatus according to the present invention, respectively.

A reading unit 808 carries out a scanning operation in a sub-scanning direction to read a document 800 placed on a document positioning glass plate 801. According to the present exemplary embodiment, at timing t5 in FIGS. 5A and 5B, the reading unit 808 of FIG. 10B first reads the document 800 from the right end thereof and next moves to the left. At timing t11 in FIGS. 5A and 5B, the reading unit 808 stops reading at the left end of the document 800. When the reading unit 808 is reading the document 800, if a buffer memory arranged in the memory 308 becomes full, the reading unit 808 stops moving and comes to a stop.

The reading unit 808 includes a plurality of light emitting elements 802 which irradiate the document 800 with light via a light guiding member 803. A sensor 804 is mounted on a sensor substrate 805 and detects the light reflected by the document 800 via a slit 806, mirror 811, and a lens 812. The plurality of light emitting elements 802 is arrayed in the main-scanning direction.

A motor 807 is a drive force which transmits driving force to the reading unit 808 via a gear 814 and a belt 815. Before a read operation, the reading unit 808 carries out calibration by using a white reference member 810 and positioning by using an edge detection member 809.

While a configuration and control of the image reading apparatus have thus been described, the present invention is not limited thereto. For example, a factor to temporarily stop a read operation is not limited to the buffer memory which becomes full. The factor may include available memory which becomes less than a predetermined threshold. Further, the factor is not merely limited to conditions relating to the buffer memory. For example, the factor may include occurrence of any other error messages and instructions from users.

In the second exemplary embodiment, the current value is controlled by comparing the elapsed time from timings t2 to t6 with the time threshold Tth. However, the current value may be controlled in another way. For example, the current value may be controlled by comparing the elapsed time from timings t3 to t6 with the time threshold Tth.

Further, while an LED is used as a light emitting element in the above exemplary embodiments, an organic light emitting diode (OLED), which is an organic electroluminescence device, may be used as a light emitting element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142538 filed Jun. 15, 2009, which is hereby incorporated by reference herein in its entirety.

What is claimed is:

1. An image reading apparatus capable of reading a document, comprising:
    a reading unit comprising a light emitting element;
    a mechanism configured to move the reading unit; and
    a control unit configured to control the reading unit and the mechanism both to carry out reading by applying electrical current to the light emitting element and moving the reading unit from a reading start position of the document towards a reading end position of the document, and to temporarily stop moving the reading unit upon occurrence of a predetermined factor before the reading unit reaches the reading end position,
    wherein the control unit sets a first current value which is caused to flow through the light emitting element when reading is carried out and sets a second current value which is less than the first current value and which is caused to flow through the light emitting element after the reading unit is temporarily stopped.

2. The image reading apparatus according to claim 1, wherein the control unit sets the first current value when the temporary stop is ended.

3. The image reading apparatus according to claim 1, wherein the control unit sets the second current value based on a lighting time length between when the light emitting element is turned on and when the reading unit is temporarily stopped.

4. The image reading apparatus according to claim 3, wherein, if the lighting time length is greater than a threshold, the control unit sets the second current value, and if the lighting time length is less than the threshold, the control unit sets a third current value which is less than the second current value.

5. The image reading apparatus according to claim 2, wherein the control unit sets the first current value based on a lighting time length between when the light emitting element is turned on and when the reading unit is temporarily stopped and a time length during which the reading unit is temporarily stopped.

6. A method for controlling an image reading apparatus configured to read a document by moving a reading unit comprising a light emitting element, the method comprising:
    carrying out reading by applying electrical current to the light emitting element and moving the reading unit from a reading start position of the document towards a reading end position of the document;
        setting a first current value which is caused to flow through the light emitting element for reading document;
    temporarily stopping the reading unit upon occurrence of a predetermined factor before the reading unit reaches the reading end position; and
    changing from the first current value to a second current value which is less than the first current value after the reading unit is temporarily stopped.

7. The image reading apparatus according to claim 1, wherein the control unit sets the first current value between a timing at which reading is temporarily stopped and a timing at which the reading is resumed.

8. An image reading apparatus capable of reading document, comprising:
    a reading unit comprising a light emitting element;
    a mechanism configured to move the reading unit; and
    a control unit configured to control the reading unit and the mechanism both to carry out reading by applying electrical current to the light emitting element and moving the reading unit from a reading start position of the document towards a reading end position of the document, and to temporarily stop moving the reading unit upon occurrence of a predetermined factor before the reading unit reaches the reading end position, wherein the control unit decreases current which is caused to flow through the light emitting element after the reading unit is temporarily stopped.

9. The image reading apparatus according to claim 8, wherein the control unit increases current which is caused to flow through the light emitting element between a timing at which reading is temporarily stopped and a timing at which reading is resumed.

\* \* \* \* \*